US012270355B2

(12) United States Patent
Mohr et al.

(10) Patent No.: US 12,270,355 B2
(45) Date of Patent: Apr. 8, 2025

(54) COMBUSTION CYLINDER END FACE COMPONENTS INCLUDING THERMAL BARRIER COATINGS

(71) Applicant: Cummins Inc., Columbus, IN (US)

(72) Inventors: Daniel J. Mohr, Columbus, IN (US); Robert Earl Hoye, Columbus, IN (US); Timothy Shipp, Seymour, IN (US); Leonard W. Brancamp, Columbus, IN (US)

(73) Assignee: Cummins Inc., Columbus, IN (US)

( * ) Notice: Subject to any disclaimer, the term of this patent is extended or adjusted under 35 U.S.C. 154(b) by 34 days.

(21) Appl. No.: 18/334,455

(22) Filed: Jun. 14, 2023

(65) Prior Publication Data

US 2023/0332555 A1 Oct. 19, 2023

Related U.S. Application Data

(63) Continuation of application No. PCT/US2021/072951, filed on Dec. 16, 2021.
(Continued)

(51) Int. Cl.
*F02F 1/24* (2006.01)
*F01L 3/04* (2006.01)
*F02F 3/14* (2006.01)

(52) U.S. Cl.
CPC .................. *F02F 1/24* (2013.01); *F01L 3/04* (2013.01); *F02F 3/14* (2013.01)

(58) Field of Classification Search
CPC ..................................... F02F 3/14; F02F 3/12
See application file for complete search history.

(56) References Cited

U.S. PATENT DOCUMENTS 3,855,986 A 12/1974 Wiss
5,645,028 A * 7/1997 Matsuoka ........... F02B 23/0603
123/279
(Continued)

FOREIGN PATENT DOCUMENTS

CN 107034429 8/2017
GB 2238349 5/1991
(Continued)

OTHER PUBLICATIONS

International Search Report and Written Opinion for International patent application No. PCT/US2021/072951, filed Dec. 16, 2021, mailed Apr. 22, 2022, 11 pgs.

*Primary Examiner* — Long T Tran
(74) *Attorney, Agent, or Firm* — Taft, Stettinius & Hollister LLP

(57) ABSTRACT

An apparatus for a combustion cylinder of a reciprocating piston engine includes a combustion cylinder end face component including a first side configured to face the combustion cylinder and extending in a radial direction of the combustion cylinder and a pocket recessed into the first side and including a recessed pocket surface. The combustion cylinder end face component may be one of a piston and a cylinder head. A thermal barrier coating is inlaid in the pocket. The thermal barrier coating includes a ceramic-metallic layer directly coating the recessed pocket surface and a ceramic layer directly coating the ceramic-metallic layer and including an outer surface facing the combustion cylinder.

20 Claims, 21 Drawing Sheets

Related U.S. Application Data

(60) Provisional application No. 63/126,666, filed on Dec. 17, 2020.

(56) References Cited

U.S. PATENT DOCUMENTS

| | | | | |
|---|---|---|---|---|
| 9,822,702 | B2 | 11/2017 | Watanabe et al. | |
| 10,519,854 | B2 | 12/2019 | Lineton et al. | |
| 10,578,014 | B2 | 3/2020 | Lineton | |
| 2003/0196547 | A1 * | 10/2003 | Bischofberger | F02B 23/0672 92/223 |
| 2010/0055479 | A1 | 3/2010 | Beardsley et al. | |
| 2013/0239924 | A1 * | 9/2013 | Sato | F02B 77/02 123/198 R |
| 2013/0327289 | A1 * | 12/2013 | Hiratsuka | F01L 3/04 123/193.6 |
| 2014/0048033 | A1 * | 2/2014 | Hess | B22D 19/0009 123/193.5 |
| 2014/0196439 | A1 * | 7/2014 | Dolan | C25D 7/04 60/299 |
| 2015/0104626 | A1 * | 4/2015 | Tomita | C09D 183/04 428/313.9 |
| 2015/0204269 | A1 * | 7/2015 | Hiratsuka | F02B 77/11 92/172 |
| 2017/0292470 | A1 * | 10/2017 | Yoshinaga | C23C 24/087 |
| 2017/0328300 | A1 * | 11/2017 | Ikai | F16J 1/01 |
| 2018/0216524 | A1 * | 8/2018 | Lineton | F01L 3/04 |
| 2021/0131375 | A1 * | 5/2021 | Kiyosue | F02F 7/0021 |
| 2021/0332749 | A1 * | 10/2021 | Nou | F02F 1/24 |

FOREIGN PATENT DOCUMENTS

| | | |
|---|---|---|
| JP | 08284666 | 10/1996 |
| JP | 2012072749 | 4/2012 |
| WO | 2016003378 | 1/2016 |
| WO | 2017160869 | 9/2017 |

* cited by examiner

COMBUSTION CYLINDER END FACE COMPONENTS INCLUDING THERMAL BARRIER COATINGS

CROSS-REFERENCE

The present application is a continuation of International Application No. PCT/US21/72951 filed Dec. 16, 2021 which claims the benefit of and priority to U.S. Application No. 63/126,666 filed Dec. 17, 2020, both of which are hereby incorporated by reference.

GOVERNMENT RIGHTS

This invention was made with Government support under DE-EE0007761 awarded by the U.S. Department of Energy. The Government has certain rights in this invention.

TECHNICAL FIELD

The present disclosure relates combustion cylinder end face components including thermal barrier coatings and methods of manufacturing combustion cylinder end components including thermal barrier coatings.

BACKGROUND

A number of proposals have been made for providing thermal barrier coatings on combustion engine structures and components. Heretofore, such proposals have suffered from a number of drawbacks and shortcomings. For example, the durability of such coatings has been limited, and separation of such coatings from metal substrates (e.g., by flaking, delamination, or other degradation) remains a significant problem. Existing proposals have also negatively impacted combustion dynamics, for example, by increasing total combustion time, thereby reducing or negating any thermodynamic benefit supposed to be realized by the coatings. Existing proposals have may require numerous processing steps, for example, requiring three or more distinct coating layers, with attendant process complexity and cost. Existing proposals also generally involve extensive coating of multiple surfaces, including surfaces with geometries which pose difficulties for coating application and post-application processing. Existing proposals also generally involve relatively indiscriminate coating of multiple surfaces with insufficient, if any, targeting relative of areas to be coated. Furthermore, such indiscriminate or untargeted proposals have created additional problems including overheating of piston rings resulting in piston ring welding. There remains a significant need for the unique apparatuses, systems, methods, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

One example embodiment comprises a unique thermal barrier coating of one or more of cylinder heads, valve faces, and pistons of internal combustion engines. Another example embodiment comprises a unique thermal barrier coating of cylinder heads and valve faces. Another example embodiment comprises a unique thermal barrier coating of cylinder heads and pistons of internal combustion engines. Another example embodiment comprises a unique thermal barrier coating of valve faces and pistons of internal combustion engines. A further example embodiment comprises a method of manufacturing a unique thermal barrier coating of one or more of cylinder heads, valve faces, and pistons of internal combustion engines. Another example embodiment comprises a method of manufacturing a unique thermal barrier coating of cylinder heads and valve faces. Another example embodiment comprises a method of manufacturing a unique thermal barrier coating of cylinder heads and pistons of internal combustion engines. Another example embodiment comprises a method of manufacturing a unique thermal barrier coating of valve faces and pistons of internal combustion engines. Further embodiments, forms, objects, features, advantages, aspects, and benefits shall become apparent from the following description and drawings.

DETAILED DESCRIPTION OF EXAMPLE EMBODIMENTS

Figure 1:
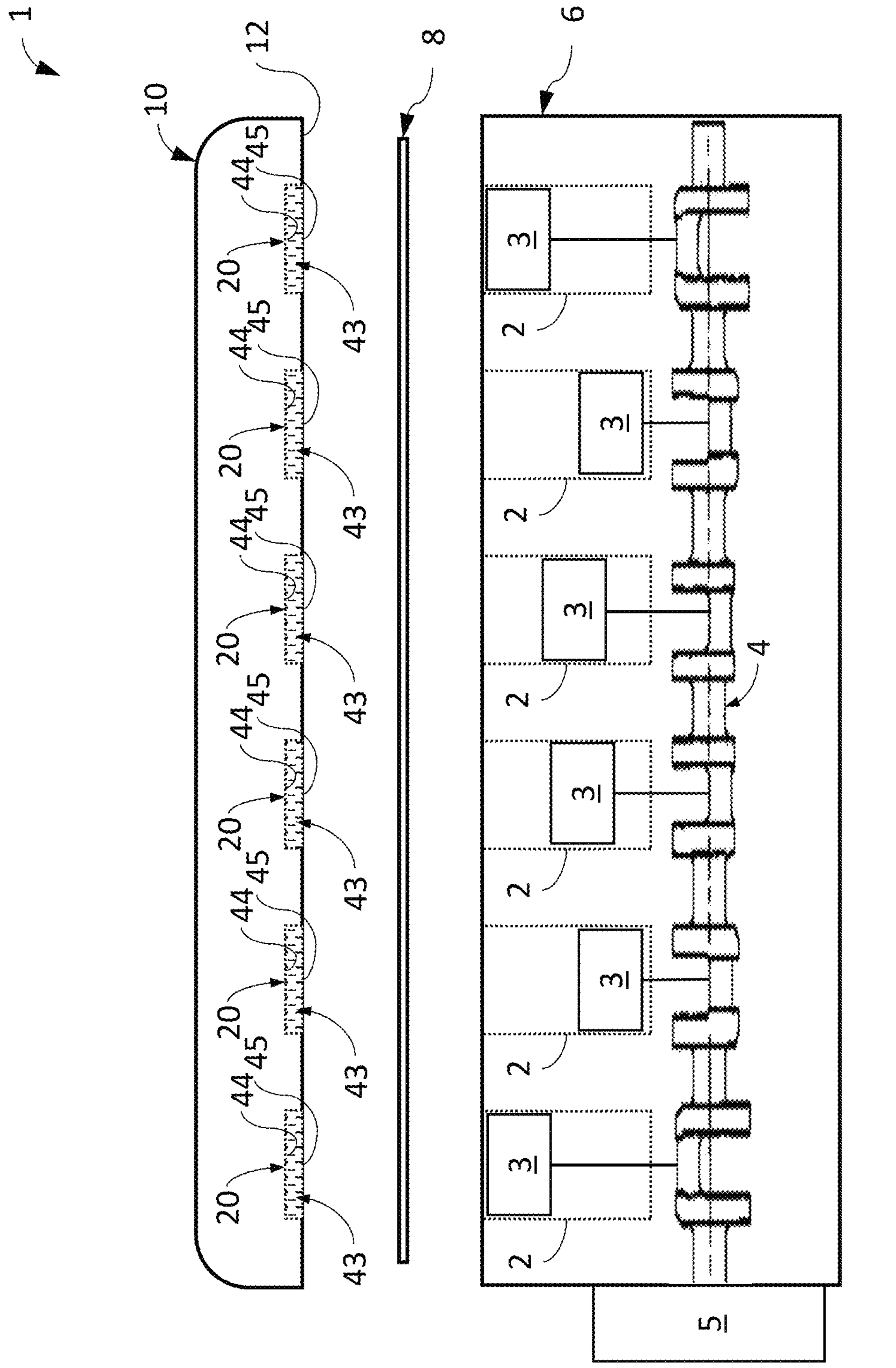
FIG. 1 is a partially exploded schematic side view of an example internal combustion engine.

Referring now to the drawings and with initial reference to FIG. 1, there is illustrated an example reciprocating piston internal combustion engine 1 (also referred to herein as engine 1) including an engine block 6, a cylinder head 10, and a head gasket 8. In the illustrated form, the engine block 6, the cylinder head 10, and the head gasket 8 are depicted in a disassembled state, it being appreciated that in an assembled state of engine 1, the cylinder head may be bolted or otherwise coupled to the engine block 6 with the head gasket 8 positioned therebetween. A plurality of combustion cylinders 2 are formed in the engine block 6 and include respective cylinder liners or other interior surfaces defining sidewalls of the respective combustion cylinders 2. A plurality of reciprocating pistons 3 are provided in respective ones of the combustion cylinders 2 and are operatively coupled with a crankshaft 4 which is operatively coupled with a flywheel or flexplate 5 to output torque to a driveshaft as well as to one or more accessories, valve actuation, or other output shafts (not depicted). Engine 1 may be a compression ignition engine adapted to combust diesel fuel injected into the cylinders 2 or may be a number of other reciprocating piston internal combustion engines configured and operable to combust other fuels or combinations of fuels (e.g., gasoline, natural gas, propane) as will occur to one of skill in the art with the benefit of the present disclosure.

The cylinder head 10 includes a first side 12 configured to cover at least a portion of the engine block 6. A plurality of pockets 20 are recessed into the first side 12 of the cylinder head 10 and are bounded by respective base metal pocket surfaces 44. The pockets 20 may also be referred to as recessed pockets or inlay pockets. The pockets 20 may be recessed into the first side 12 to a depth of 0.5 mm or to another suitable depth. The pockets 20 are positioned to substantially align within the combustion cylinders 2 of the engine block 6 when the cylinder head 10 is coupled therewith and preferably to not extend into or encroach beyond the area defined by the interior of the cylinder walls so as to avoid any interference with the head gasket 8 after assembly of the engine 1.

Thermal barrier coatings (TBC) 43 are inlaid in the pockets 20 onto respective base metal pocket surfaces 44 which comprise uncoated base metal of the cylinder head 10. TBC 43 include respective outer surfaces 45 oriented to face respective combustion cylinders 2 of the engine block 6. The TBC 43 include respective ceramic-metallic layers applied directly to the pocket surface and respective ceramic layers applied directly to the ceramic-metallic layer. The ceramic-metallic layers directly coat respective base metal pocket surfaces 44. The ceramic layers directly coat the ceramic-metallic layer and include an outer surface oriented to face a combustion cylinder.

The ceramic-metallic layer may be applied directly to base metal pocket surfaces 44 of the pockets 20 without requiring application or presence of a metallic bond coat intermediate the ceramic-metallic layer and the of the recessed pocket provided in the cylinder head. The ceramic-metallic layer may comprise a Nickle/Cobalt-Chromium-Aluminum-Yttria (MCrAlY) composite material, where M may be Co, Ni, NiCo (a nickel-based nickel-cobalt alloy), or CoNi (a cobalt-based nickel-cobalt alloy). The ceramic-metallic layer may also comprise other ceramic-metallic composite materials including a ceramic composite component and one or more metallic components as will occur to one of skill in the art with the present disclosure. Non-limiting examples of such ceramic-metallic composite materials include Iron Chromium Aluminum Yttrium (FeCrAlY) composites, Nickle/Cobalt-Chromium-Aluminum-Tantalum-Yttria (MCrAlTaY) composites, and Nickle/Cobalt-Chromium-Aluminum-Hafnium-Silicon-Yttria (MCrAlHaSiY) composites, to name several examples.

The ceramic layer may comprise a ceramic material Yttria-stabilized zirconia (YSZ) which is a ceramic in which the cubic crystal structure of zirconia ($ZrO_2$) is made stable at room temperature by the addition of Yttria ($Y_2O_3$). The ceramic material may also comprise other ceramic materials as will occur to one of skill in the art with the present disclosure. Non-limiting examples of such ceramic materials include Alumina, Mullite, Rare-earth zirconates, rare-earth oxides, and combinations of Ceria and Yttria-stabilized zirconia (CeO2+YSZ), to name several examples.

The ceramic-metallic layer of the TBC may have a thickness (e.g., an average thickness) of 350 μm+/−10% in some embodiments or of 350 μm+/−20% in some embodiments. The ceramic layer of the TBC 43 may have a thickness (e.g., an average thickness) of 125 mm+/−10% in some embodiments or of 125 mm+/−20% in some embodiments. In one example embodiment, the ceramic-metallic layer and the ceramic layer of the TBC 43 may include the materials, dimensions, and characteristics summarized in Table 1 below.

TABLE 1

| Layer | Thickens | Material | Density | Heat Capacity | Thermal Conductivity |
|---|---|---|---|---|---|
| Ceramic-Metallic Layer | 350 μm | MCrAlY | 512 kg/m$^3$ | 460 J/kg/K | 1.2 W/m/k |
| Ceramic Layer | 127 μm | YSZ | 680 kg/m$^3$ | 460 J/kg/K | 25 W/m/k |

During testing, a thermal barrier coating according to Table 1 was demonstrated to provide a closed cycle efficiency of 53.4% representing an increase in closed cycle efficiency of 0.85% relative to a cylinder head that lacked a thermal barrier coating. Such benefit was realized in addition to a plurality of other combustion chamber optimizations including optimizations of materials, tolerances, and heat transfer features, which collectively had previously been applied to provide a 1.3% increase in closed-cycle efficiency. Thus, the TBC provided an additive or cumulative increase in closed cycle efficiency rather than being negated, for example, by negative or non-cumulative effects with other features.

The TBC 43 provides one example of a two-layer TBC consisting essentially of a ceramic-metallic layer applied directly to a pocket surface and directly coating the pocket surface and a ceramic layer applied directly to the ceramic-metallic layer and directly coating ceramic-metallic layer. It shall be appreciated two-layer TBCs according to the present disclosure do not require and preferably omit a metallic bond layer (sometimes referred to as a metallic bond coat or coating) as a first layer applied to an underlying surface of the cylinder head. It shall also be appreciated two-layer TBCs according to the present disclosure do not require and preferably omit a metallic top layer (sometimes referred to as a metallic top coat or coating) as a final layer applied to an upper surface of a thermal barrier coating. It shall be further appreciated that two-layer TBCs according to the present disclosure do not require and preferably omit other tertiary layers, coats or coatings which are required in coatings with three or more layers.

Figure 2:
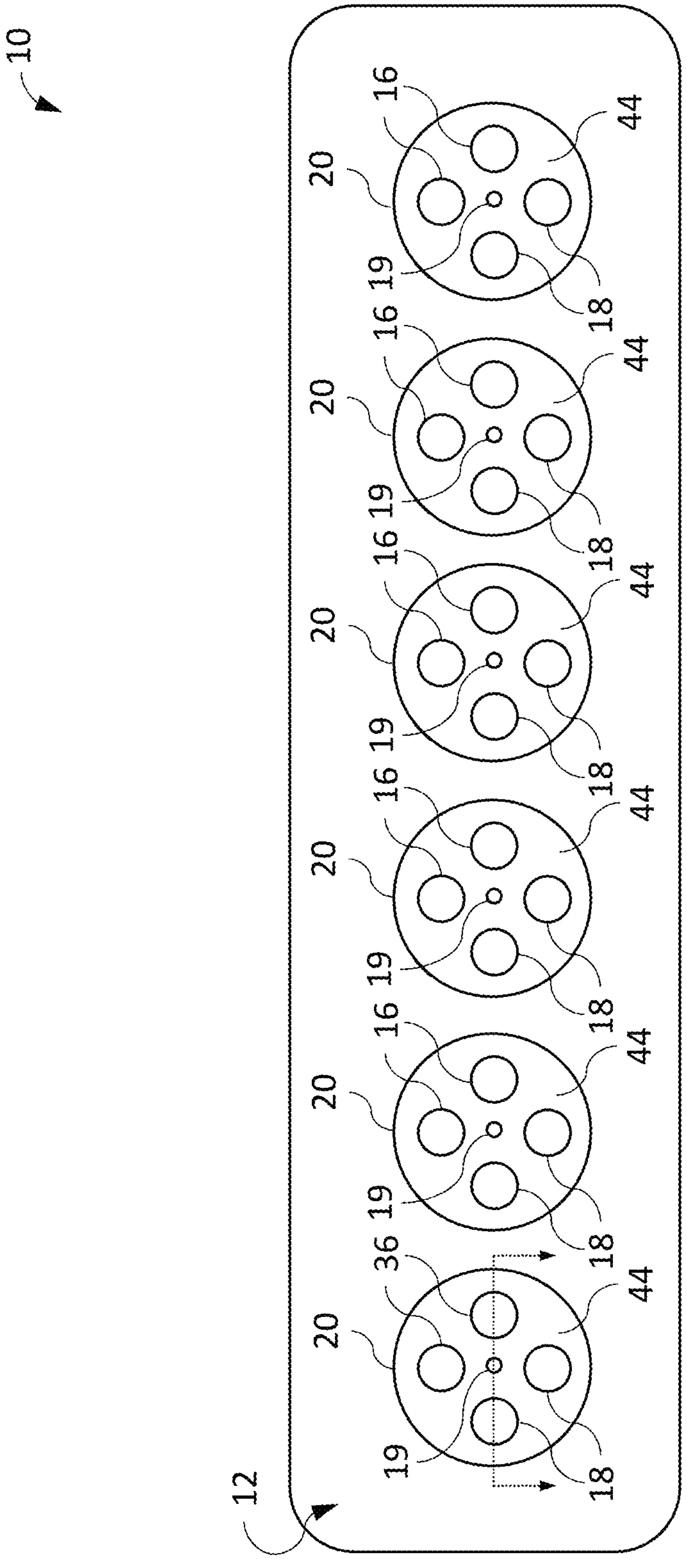
FIG. 2 is a bottom view of a cylinder head of the internal combustion engine of FIG. 1 prior to application of a thermal barrier coating.
Figure 3:
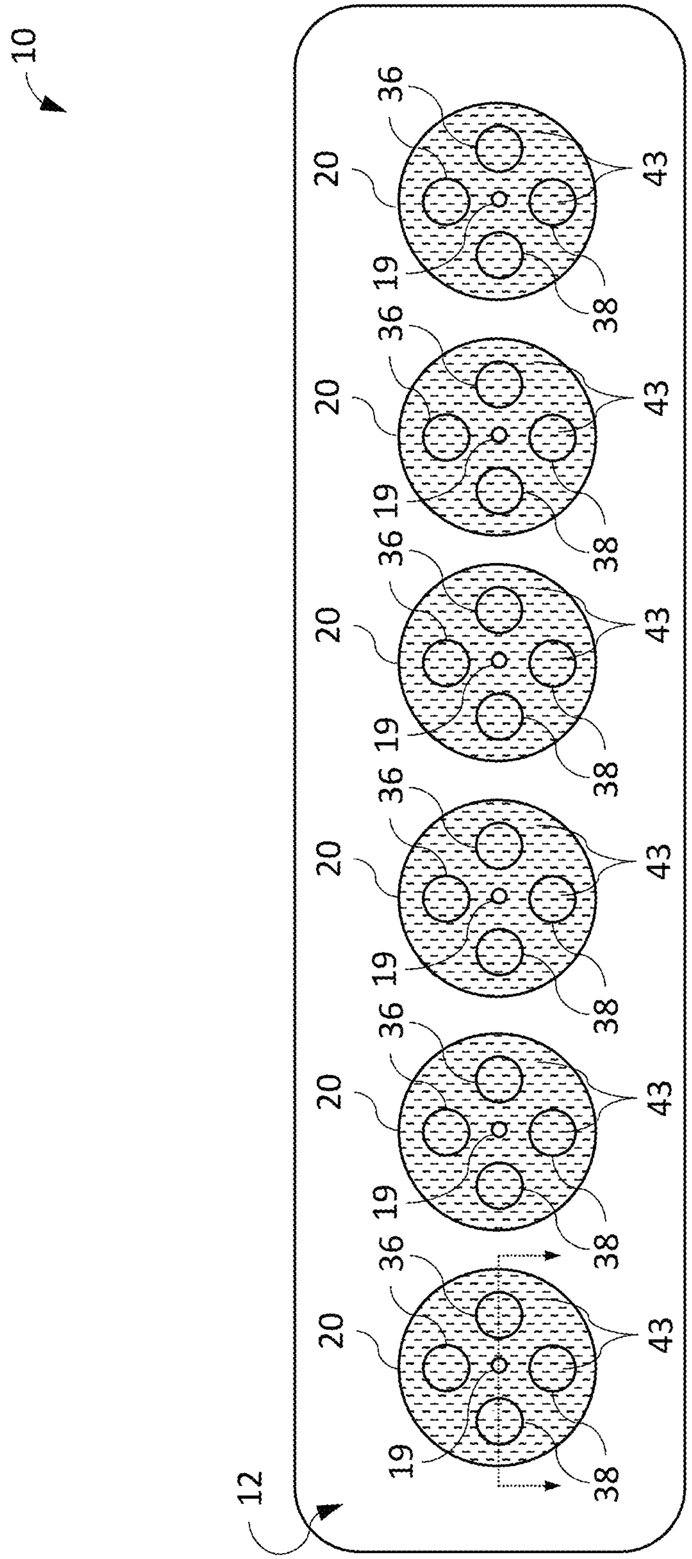
FIG. 3 is a bottom view of a cylinder head of the internal combustion engine of FIG. 1 after application of a thermal barrier coating.

As illustrated in the views of FIGS. 2 and 3, a plurality intake valves 36 and exhaust valves 38 are inserted into and seated in respective ports formed in and extending through the first side 12 of the cylinder head 10 within respective areas of the pockets 20. In the illustrated example, each of the pockets 20 is provided with two intake valves 36 and two exhaust valves 38, it being appreciated that other embodiments include different numbers of intake valves and exhaust valves. During operation of the engine, the intake valves 36 and the exhaust valves 38 are actuated to selectably contact and move apart from a valve seat surface of the cylinder head 10. A plurality of fuel injector bores 19 are also formed in and extending through the first side 12 of the cylinder head 10. FIG. 2 depicts the first side 12 of the cylinder head 10, the intake valves 36, and the exhaust valves 38 prior to application of the TBC 43 and FIG. 3 illustrates these structures after application of the TBC 43.

With reference to FIGS. 4-13, there are illustrated sectional views of a portion of the cylinder head 10 at a number of points in an example manufacturing process. The views of FIGS. 4-13 depict only a portion of the cylinder head 10, and a subset of the total number of pockets 20, intake valve ports 16, intake valves 36, exhaust valve ports 18, exhaust valves 38, and fuel injector bores 19. It shall be appreciated that the illustrated portions and subsets are indicative of process states and structural features present in other portions of the cylinder head 10 and other instances of the pockets 20, intake valve ports 16, intake valves 36, exhaust valve ports 18, exhaust valves 38, and fuel injector bores 19. It shall be appreciated that the cylinder head 10 is one example of a base metal workpiece on which the operations illustrated and described in connection with FIGS. 4-13 may be performed. It is further contemplated that some or all of the operations illustrated and described in connection with FIGS. 4-13 may be performed on other base metal workpieces of a cylinder end face component such as another cylinder head or piston.

Figure 4:
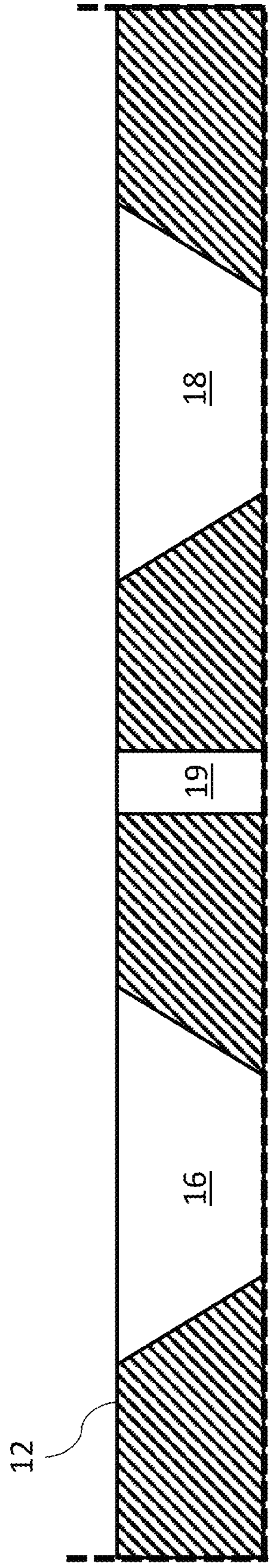
FIGS. 4-13 are sectional views of a portion of the cylinder head of FIG. 2 at a number of points in an example manufacturing process.
Figure 5:
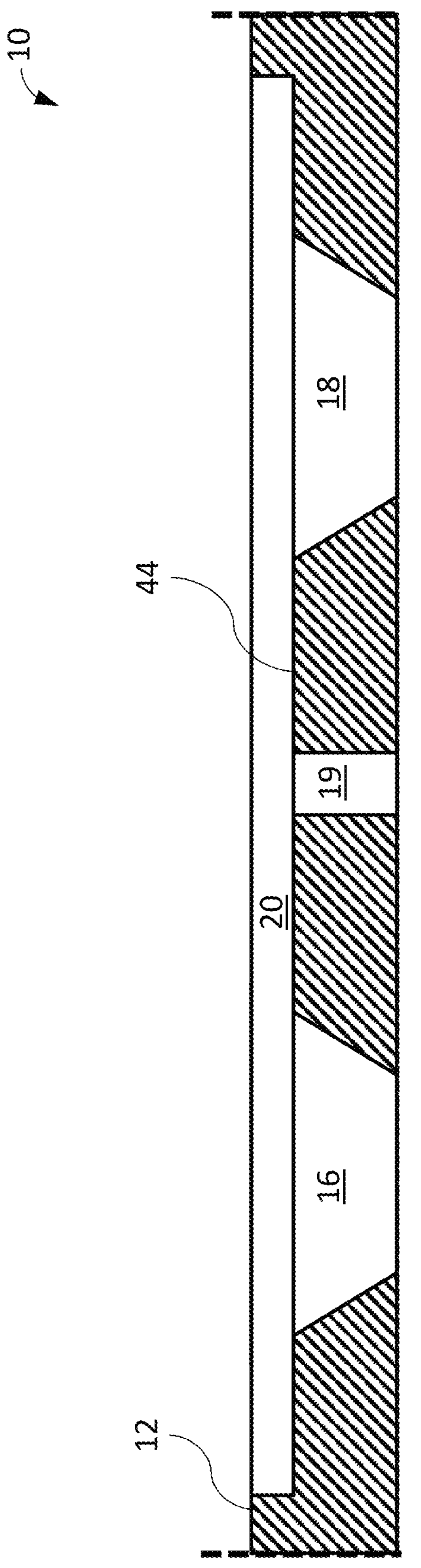
Figure 6:
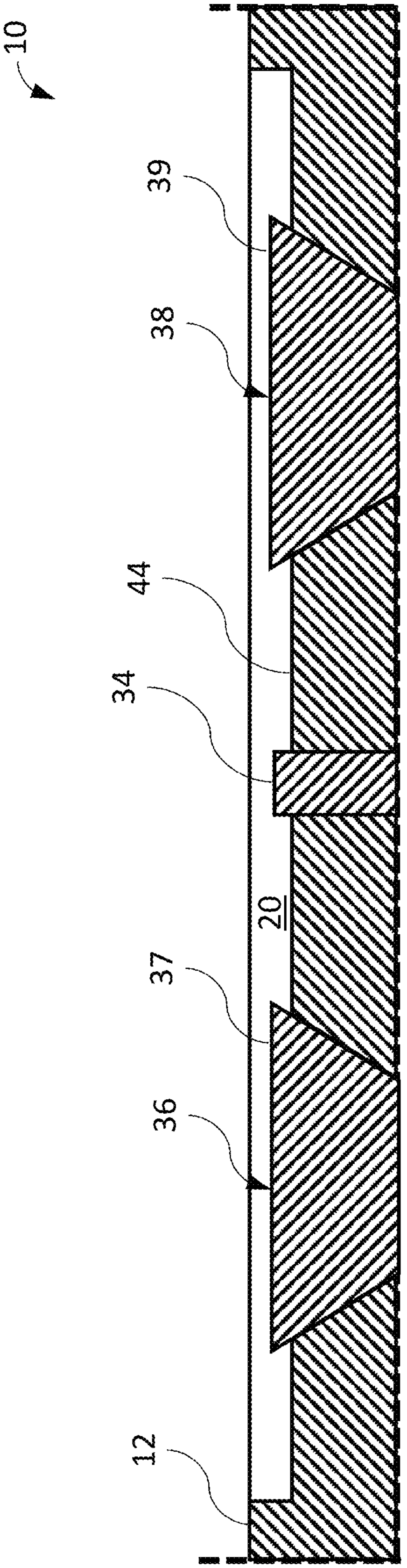

FIG. 4 illustrates a portion of the cylinder head 10, intake valve port 16, and exhaust valve port 18 prior to formation of the pockets 20. In some embodiments, the pockets 20 may be formed after providing the cylinder head such as illustrated in FIG. 5. The pockets may thereafter be formed by boring or machining into the first side 12 of the cylinder head 10. In some embodiments, the pockets 20 may instead be pre-formed or provided during formation of cylinder head 10. In either case, a cylinder head 10 including the pockets 20 is provided prior to application of the TBC 43, for example, as depicted in FIG. 5 which illustrates the portion of the cylinder head 10, intake valve port 16, exhaust valve port 18, and a respective pocket 20. As illustrated in FIG. 6, one of the intake valves 36 and one of the exhaust valves 38 may thereafter be inserted into intake valve port 16, and exhaust valve port 18, and a fuel injector bore plug 34 (which could be a fuel injector but is preferably a consumable plug of appropriate dimensions) may be provided in the fuel injector bore 19. The combustion faces of intake valves 36 and the exhaust valves 38 may also be machined to the same depth as the pockets 20 (e.g., 0.5 mm) or, in other embodiments, may be pre-formed with such a reduced combustion face.

Figure 7:
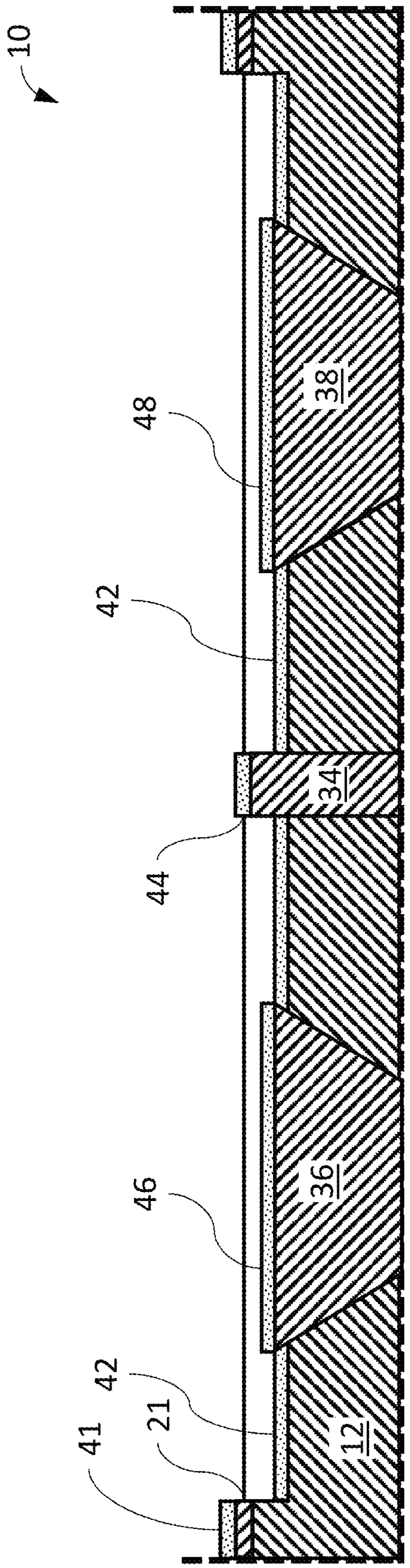

In the state illustrated in FIG. 6, the first side 12 of the cylinder head, the intake valve 36, and the exhaust valve 38 are a state suitable for initiation of application of the TBC 43 including the application of a first layer of the TBC. Accordingly, a ceramic-metallic layer 42 may be applied directly to base metal pocket surfaces 44 of the pockets 20, a ceramic-metallic layer 46 may be applied directly to the combustion face 37 of the intake valve 36, and ceramic-metallic layer 48 may be applied directly to the combustion face 39 of the exhaust valve 38. A ceramic-metallic layer 144 may also be applied to the fuel injector bore plug 34 and a ceramic-metallic layer 41 may be also be applied to a mask 21 which is provided over a portion of the first side 12 surrounding the pockets 20 prior to initiating any coating operation to limit the application of the coating to the area of the pockets 20. It shall be appreciated that the ceramic-metallic layers 41, 42, 144, 46, 48 may be considered collectively as one ceramic-metallic layer or individually as distinct ceramic-metallic layers inasmuch as the underlying substrate structures to which they are applied are distinct. The aforementioned ceramic-metallic layers may be formed by thermal spraying or other suitable techniques and may comprise the materials and attributes described above. FIG. 7 illustrates the cylinder head 10 after the application of the aforementioned ceramic-metallic layers.

Figure 8:
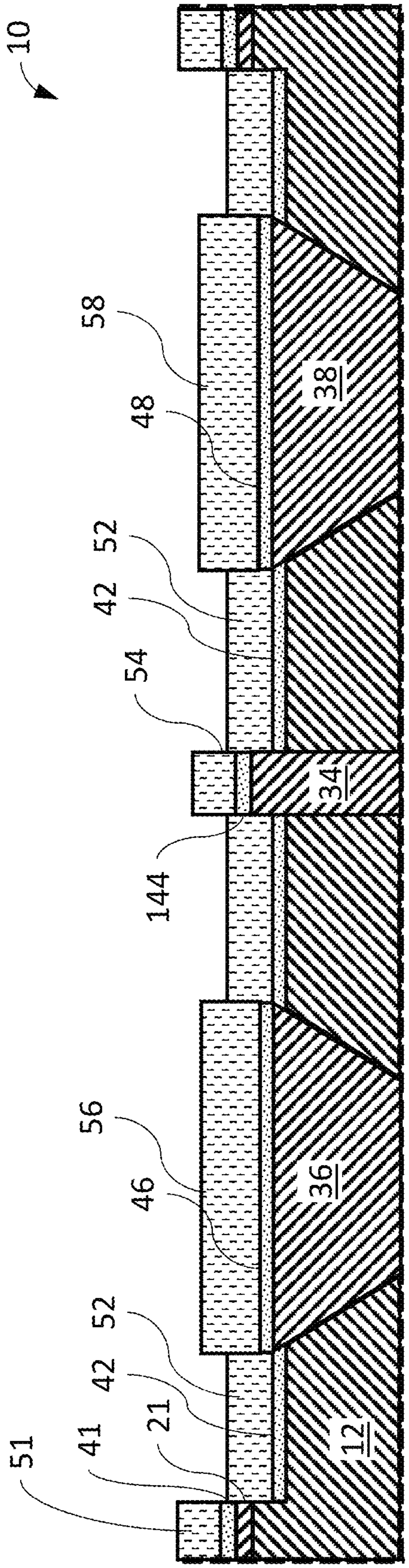

In the state illustrated in FIG. 7, the cylinder head 10 is in a state suitable for the application of a second layer of the TBC 43. Accordingly, a ceramic layer 52 may be applied directly to the ceramic-metallic layer 42, a ceramic layer 56 may be applied directly to the ceramic-metallic layer 46, and a ceramic layer 58 may be applied directly to the ceramic-metallic layer 48. A ceramic layer 54 may also be applied to the ceramic-metallic layer 144 and a ceramic layer 51 may be also be applied to the ceramic-metallic layer 41. It shall be appreciated that the ceramic layers 51, 52, 54, 56, 58 may be considered collectively as one ceramic layer or individually as distinct ceramic layers inasmuch as the underlying materials to which they are applied and the substrate structures underlying those materials are distinct. The aforementioned ceramic layers may be formed by thermal spraying or other suitable techniques and may comprise the materials and attributes (both positive and exclusionary) described above. FIG. 8 illustrates the cylinder head 10 after application of the aforementioned ceramic-metallic layers and the aforementioned ceramic layers of the TBC 43.

Figure 9:
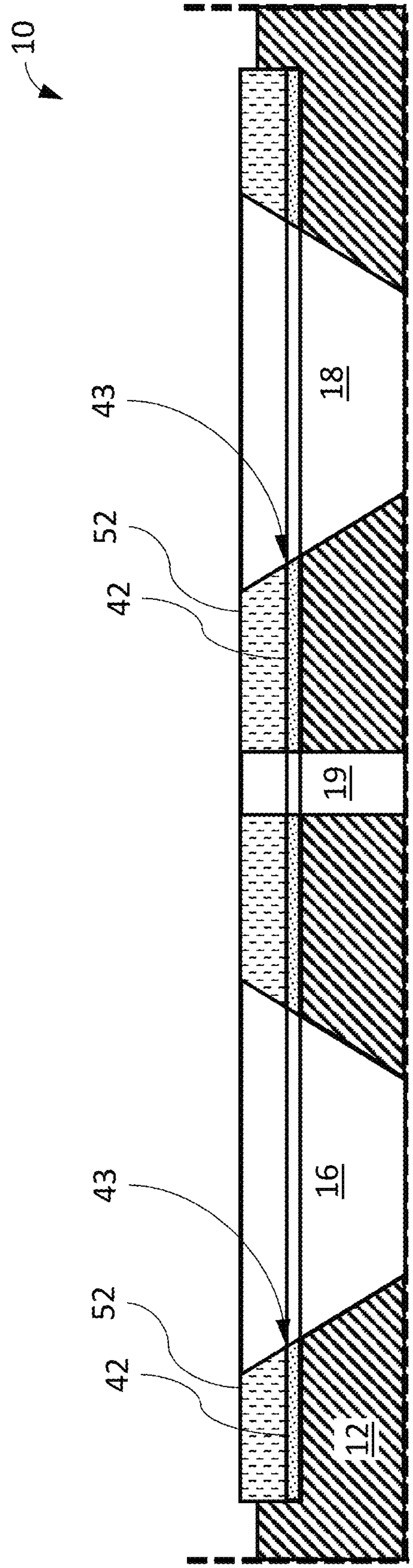

From the state illustrated in FIG. 8, the mask 21 and the TBC portions provided thereon may be separated from the cylinder head 10, and the intake valve 36 and the exhaust valve 38 and the TBC portions provided thereon may be removed from the cylinder head 10. After removal of mask 21 and separation of the intake valve 36 and the exhaust valve 38, the cylinder head 10 is in the state illustrated in FIG. 9. In the states of FIGS. 8 and 9, the TBC 43 has been applied to a first thickens (e.g., a first average thickens) that is proud of (i.e., extends above or beyond) the first side 12.

Figure 10:
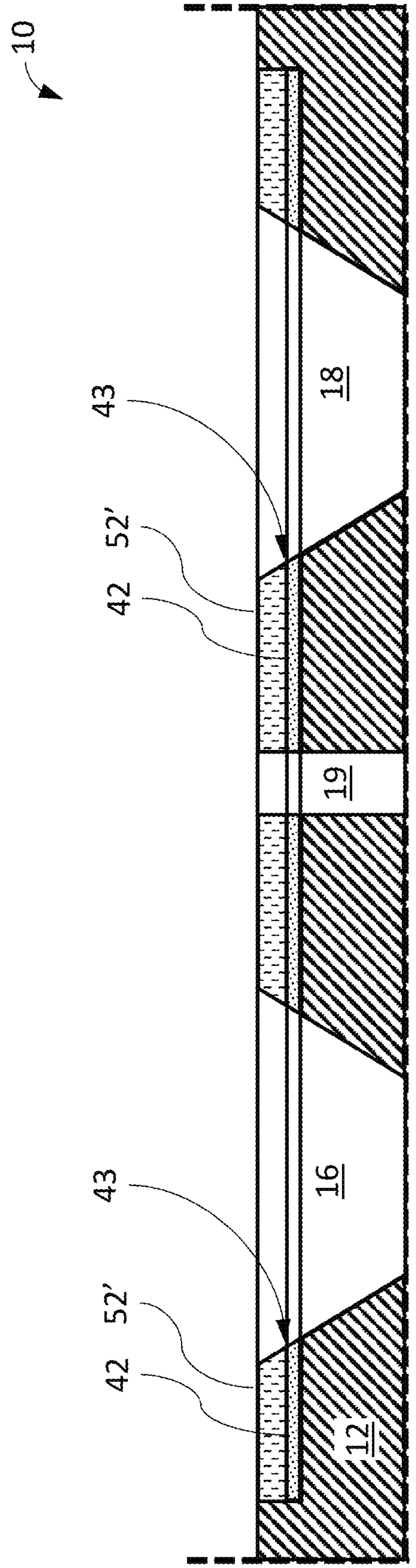

From the state illustrated in FIGS. 8 and 9, the TBC 43 of the cylinder head may be ground using a micron-order grinder to reduce its thickness and roughness effective to provide ground ceramic layer 52'. In certain embodiment, the TBC 43 may be ground from a first thickens to a second thickness (e.g., a second average thickens) that is flush with the first side. Such grinding may also be effective to decrease the roughness (e.g., an average roughness such as Ra) of the outer surface of the TBC. For example, the roughness of the TBC may be ground to a second roughness that is less than a first pre-grind roughness. In some embodiments, the second roughness may and equal to or less than a roughness of the native or initial outer surfaces of the first side 12 of the cylinder head 10 which would otherwise cover the combustion cylinders 2. In some embodiments, the second roughness may and equal to or less than 110% of the roughness of the native or initial outer surfaces of the first side 12 of the cylinder head 10 which would otherwise cover the combustion cylinders 2. In some embodiments, grinding may be performed to achieve other desired roughnesses. FIG. 10 illustrates the cylinder head 10 and the TBC 43 including ground ceramic layer 52' after such grinding operations have been performed.

It shall be appreciated that the foregoing and other grinding operations disclosed herein are examples of surface treating operations that can be performed to decrease the roughness or smoothen an outer surface of a TBC. A number of other surface treating operations may also be utilized in various embodiments including, for example, machining, polishing, fluid treating, shot peening, blasting, laser or other directed energy treating, or multi-step processes including combinations of the foregoing or other surface treating operations and techniques.

Figure 11:
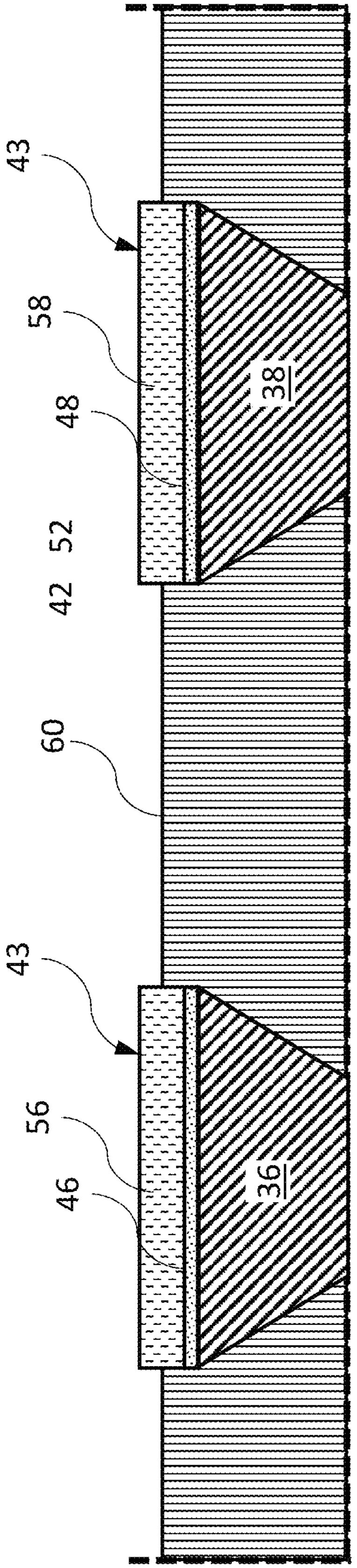
Figure 12:
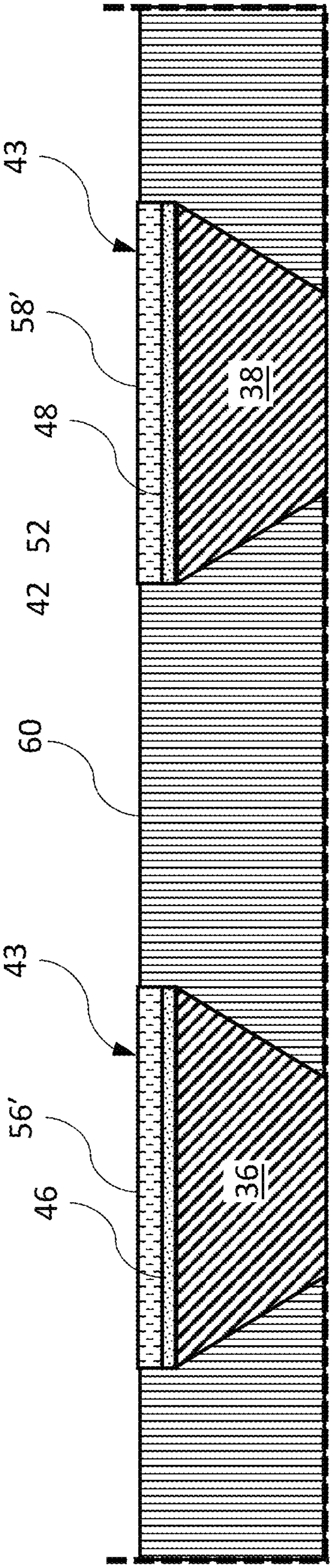

After the intake valve 36 and the exhaust valve 38 are separated from the cylinder head 10, either or both valves may be coupled with a grinding jig 60. FIG. 11 illustrates the intake valve 36, the exhaust valve 38, and the grinding jig 60 in a state ready for a grinding operation to be performed.

In the state illustrated in FIG. 11, the TBC 43 of the intake valve 36 and the exhaust valve 38 may be ground using a micron-order grinder to reduce its thickness and roughness effective to provide ground ceramic layers 56', 58'. In certain embodiment, the TBC 43 may be ground from a first thickens to a second thickness (e.g., a second average thickens) corresponding to that of the post-ground TBC of the cylinder head 10. Such grinding may also be effective to decrease the roughness (e.g., an average roughness such as Ra) of the outer surface of the TBC. For example, the roughness of the TBC may be ground to a second roughness that is less than a first pre-grind roughness. In some embodiments, the second roughness may and equal to or less than a roughness of the native or initial outer surfaces of the first side 12 of the cylinder head 10 which would otherwise cover the combustion cylinders 2. In some embodiments, the second roughness may and equal to or less than 110% of the roughness of the native or initial outer surfaces of the first side 12 of the cylinder head 10 which would otherwise cover the combustion cylinders 2. In some embodiments, grinding may be performed to achieve other desired roughnesses. FIG. 11 illustrates the intake valve 36 and the exhaust valve 38 including ground ceramic layers 56', 58' after such grinding operations have been performed.

Figure 13:
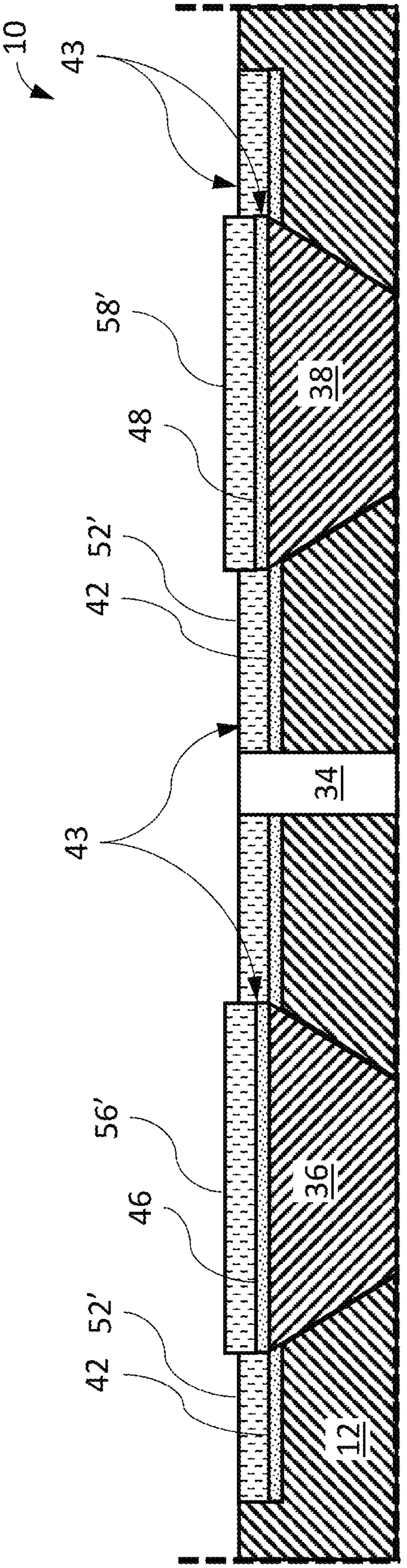

After completion of the aforementioned grinding operations, the intake valve 36 and the exhaust valve 38 carrying their respective portions of the TBC 43 may be coupled with or installed in the cylinder head carrying its respective portion of the TBC 43. FIG. 13 illustrates an example of such a state.

Figure 14:
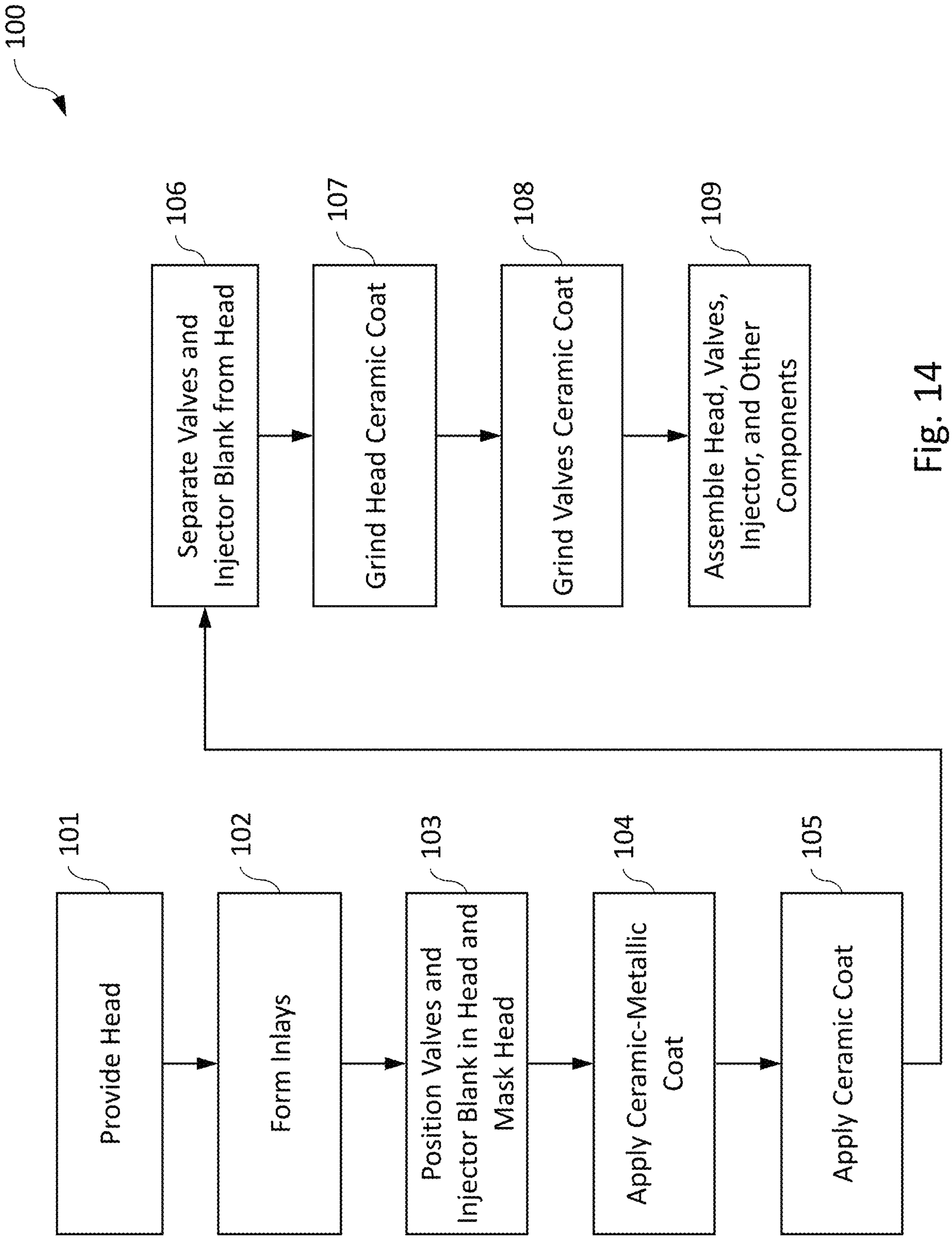
FIG. 14 is a flowchart illustrating certain operations of an example manufacturing process.

With reference to FIG. 14, there is illustrated a flow chart according to an example process 100 according to the operations and states illustrated and described in connection with FIGS. 4-13. The process 100 proceeds in order from operation 101 through and including operation 109, although the order of certain operations may be changed or performed in parallel or concurrently as noted below. At operation 101, a cylinder head is provided. At operation 102, inlay pockets are formed in the cylinder head and the combustion faces of the intake and exhaust valves for the cylinder head are machined to the same depth. In some embodiments, operation 102 may be omitted and a cylinder head including pre-formed inlay pockets and/or valves preformed to the reduced dimensions may be provided at operation 101. At operation 103, intake valves, exhaust valves, and a fuel injector bore plug are positioned in the cylinder head and a mask is applied to cover portions of the cylinder head surrounding the pockets.

At operation 104, a ceramic-metallic coat is applied directly to surfaces of the inlay pockets, intake valves, exhaust valves, fuel injector bore plug, and the mask. At operation 105, a ceramic coat is applied directly to the surfaces of the ceramic-metallic coat. At operation 106, the intake valves, exhaust valves, and are separated from the cylinder head. At operation 107, the ceramic coat of the cylinder head is ground as described herein above. At operation 108, the ceramic coat of the valves is ground as described herein above. It shall be understood that the order of operations 107 and 108 may be reversed or that operations 107 and 108 may be performed concurrently or in parallel. At operation 109, the cylinder head, intake valves, exhaust valves, and other components are assembled to provide an internal combustion engine or an intermediate assembly portion thereof.

Figure 15:
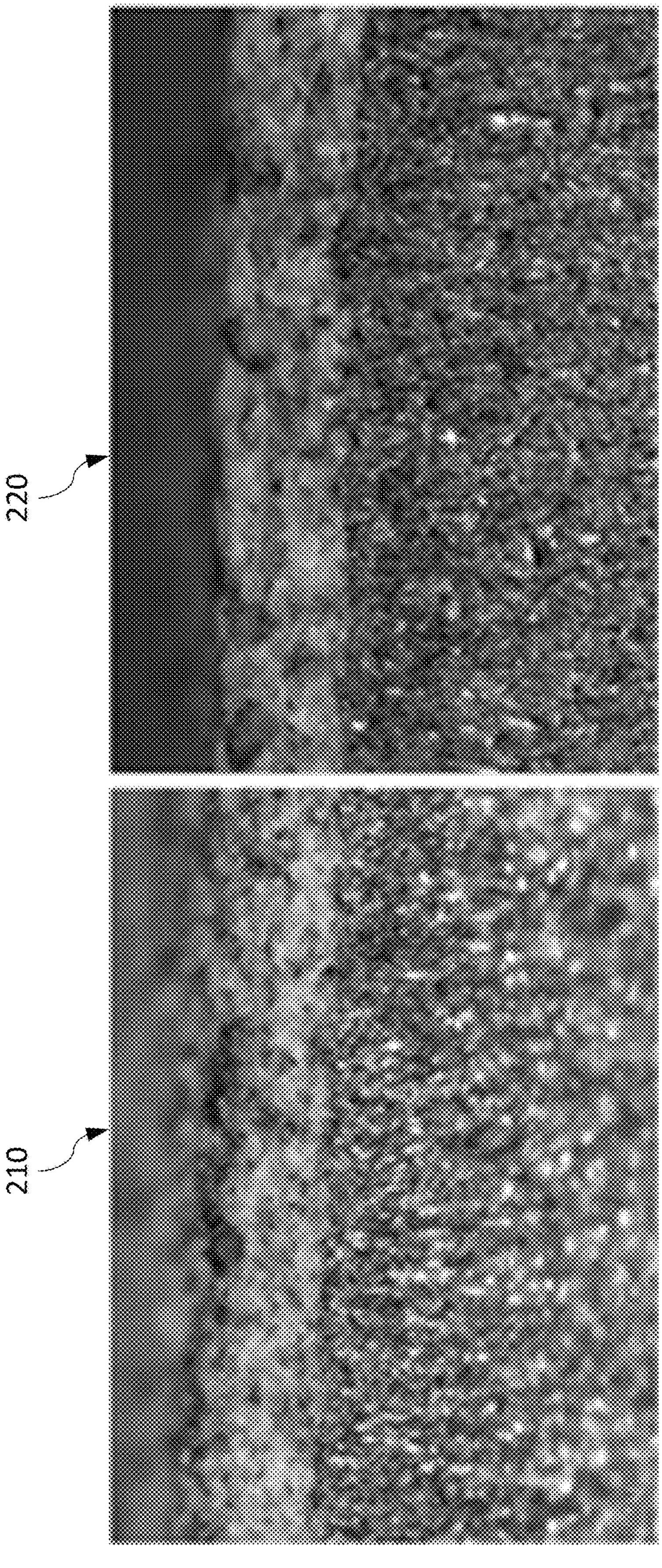
FIG. 15 depicts sectional micrographic views of a portion of a thermal barrier coating before and after a grinding operation.

With reference to FIG. 15, there is illustrated a section 210 of the TBC 43 after application but before the above-described grinding operation, and a section 220 of the TBC after the above-described grinding operation. Preferably the final dimensions of the cylinder head 10, the intake valves 38, the exhaust valves, and their collective assembly are substantially the same after completion of the application process providing the TBC 43 as for the pre-coating process components and assembly.

Figure 16:
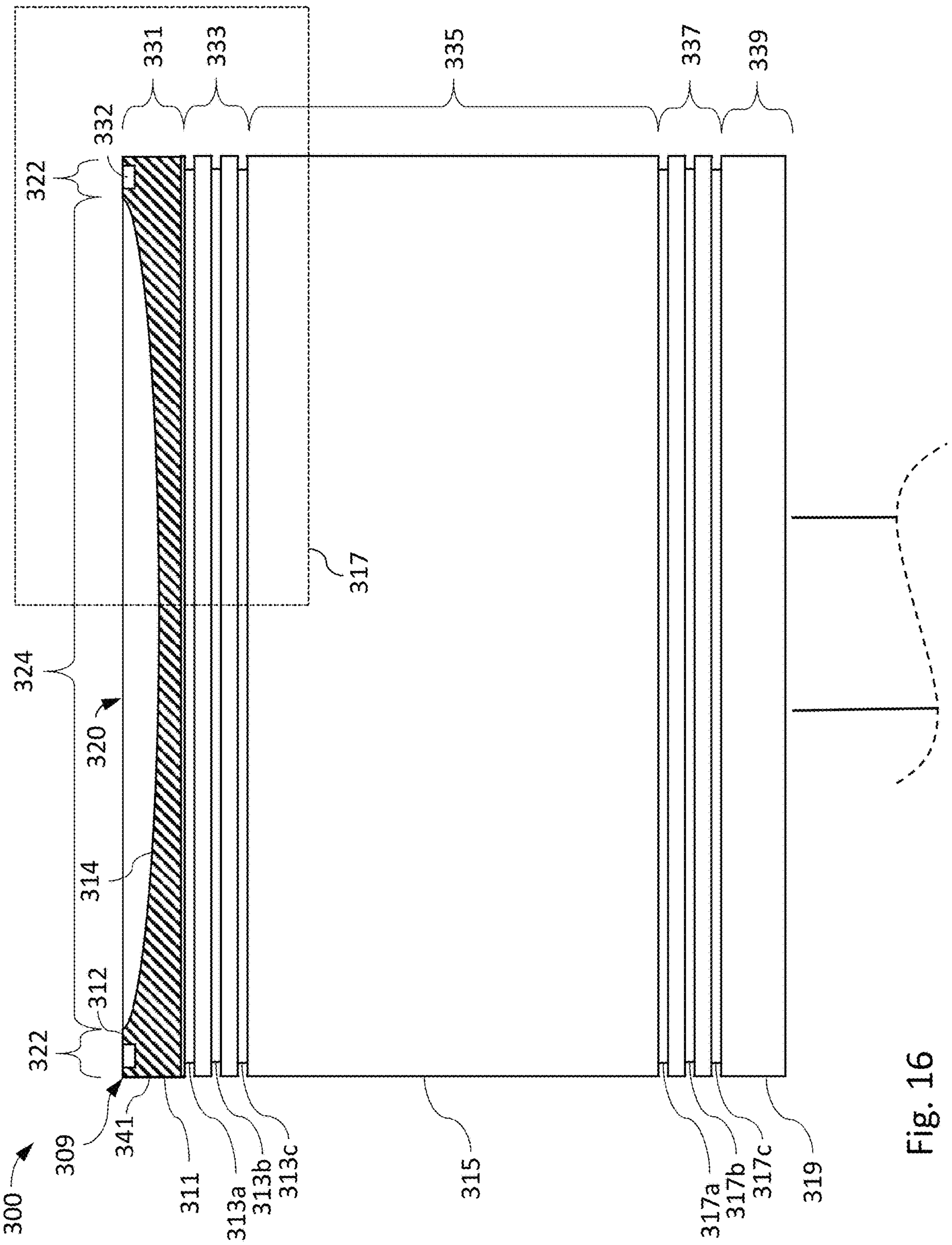
FIG. 16 is a partially sectional side view of a piston of the internal combustion engine of FIG. 1 prior to application of a thermal barrier coating.
Figure 21:
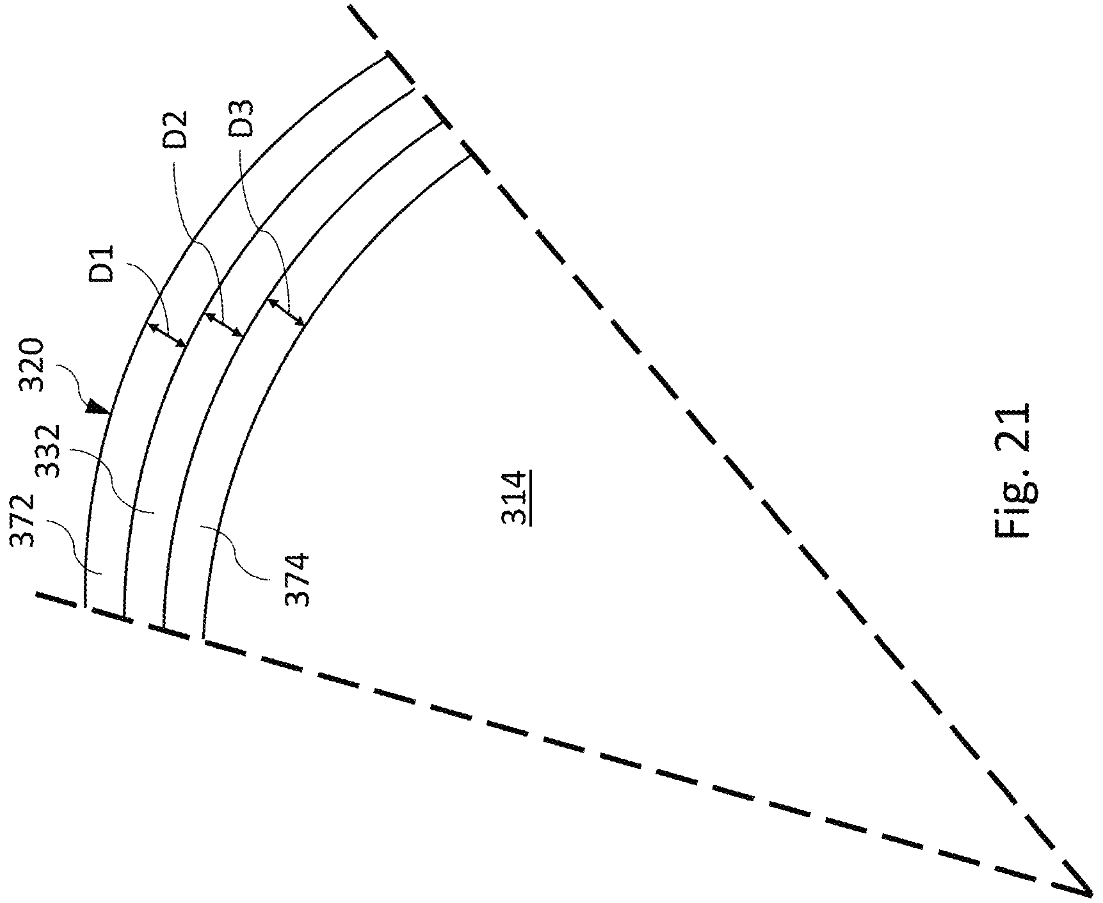
FIG. 21 is an enlarged partial view of FIG. 20.

With reference to FIGS. 16 and 21, there are illustrated several views of an example piston 300. It shall be appreciated that one or more of the plurality of pistons 3 of the engine system 1 may be configured and provided in the form of piston 300 as well as in other forms according to the present disclosure.

The piston 300 comprises a piston body formed of a base metal and including a crown 312, a bowl 314, an upper land 311, upper ring grooves **313*a*, 313*b*, 313*c*, a middle land 315, lower ring grooves 317*a*, 317*b*, 317*c*, and a lower land 319. The piston 300 includes an exterior surface 309 comprising a top surface region 320 configured and oriented to face a combustion cylinder (e.g., one of combustion cylinders 2 of engine 3), and a side surface region 330 extending downward from the top surface region 320. Piston rings (not illustrated) may be provided in upper ring grooves 313*a*, 313*b*, 313*c*, and lower ring grooves 317*a*, 317*b*, 317*c***.

Figure 17:
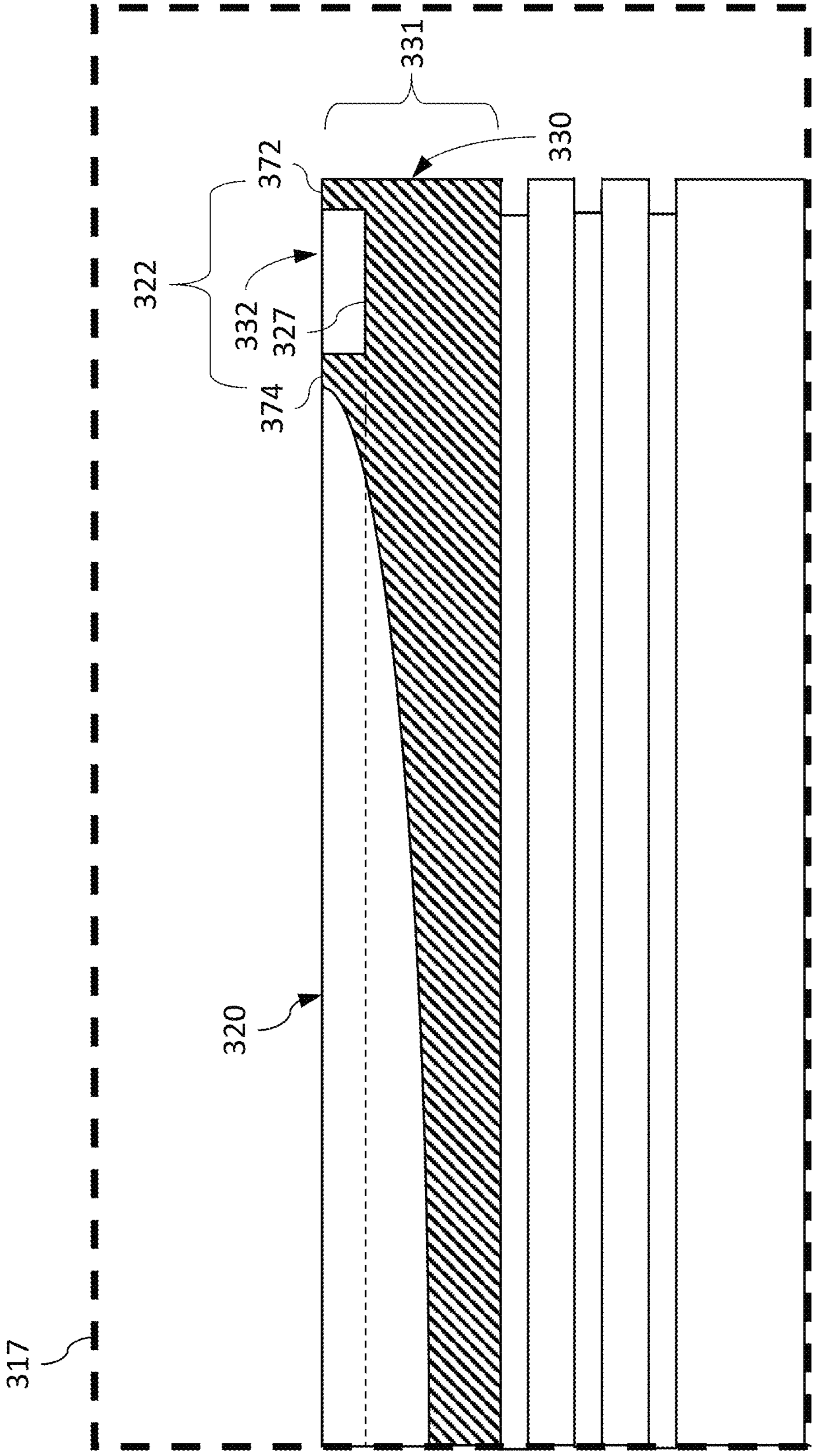
FIG. 17 is an enlarged partial view of FIG. 18.

The top surface region 320 comprises a crown surface region 322 and a bowl surface region 324 extending inward and downward from the crown surface region 322. The pocket 332 is located in the crown surface region 322 and is recessed into crown 312. As illustrated in FIG. 16 and FIG. 17 (which illustrates an enlarged portion 317 of FIG. 16), prior to application of the TBC, pocket 332 includes a pocket surface 327 of uncoated base metal of the piston 300. In the illustrated embodiment, pocket 332 is positioned and extends intermediate a radially inner annular base metal portion 374 of the crown 312 and a radially outer annular base metal portion 372 of the crown 312. In other embodiments, the pocket 332 may be positioned and extend from the radially inner annular base metal portion 374 of the crown 312 to the outer diameter of the piston 300 and the radially outer annular base metal portion 372 of the crown 312 may be omitted.

Figure 18:
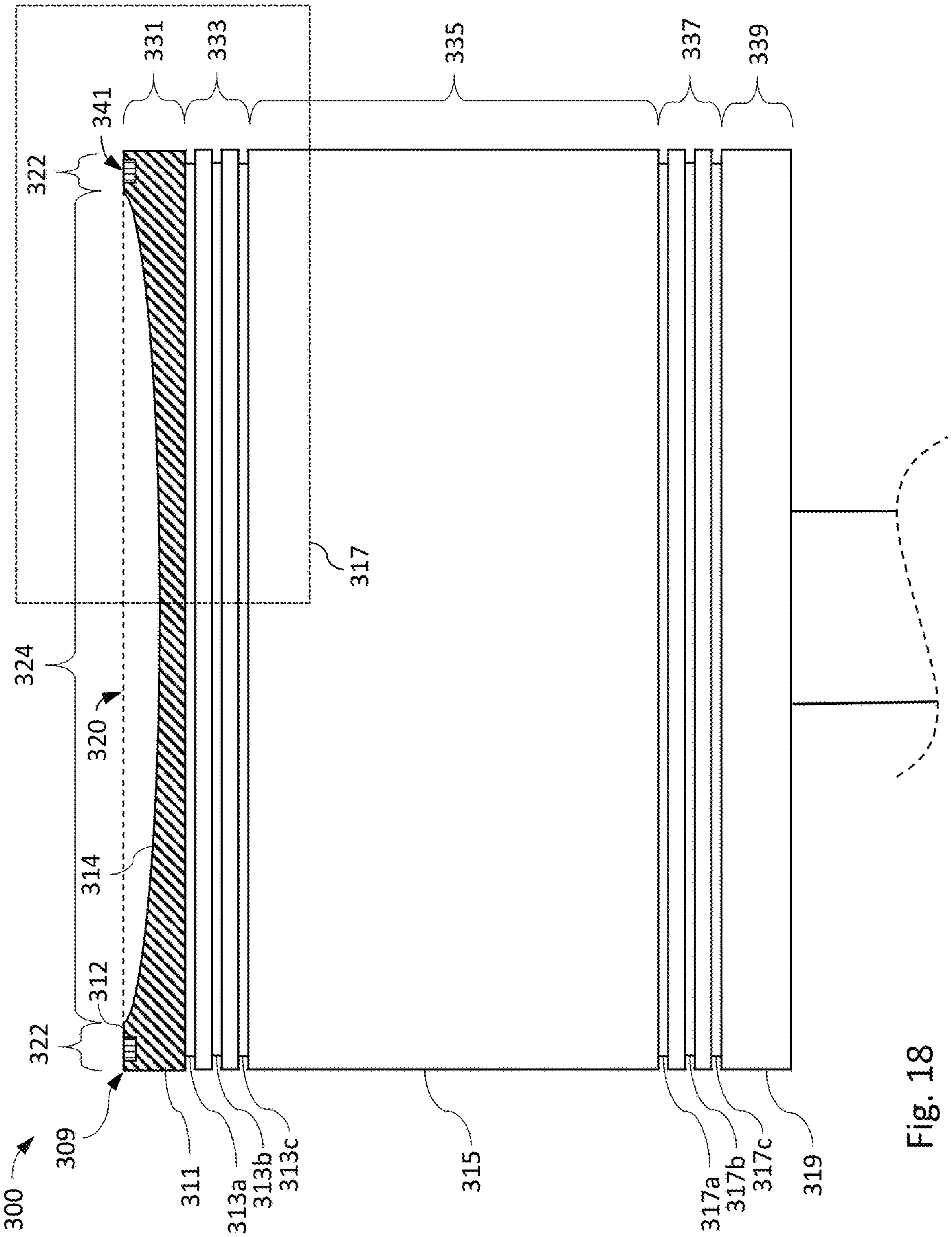
FIG. 18 is a partially sectional side view of a piston of the internal combustion engine of FIG. 1 after application of a thermal barrier coating.
Figure 19:
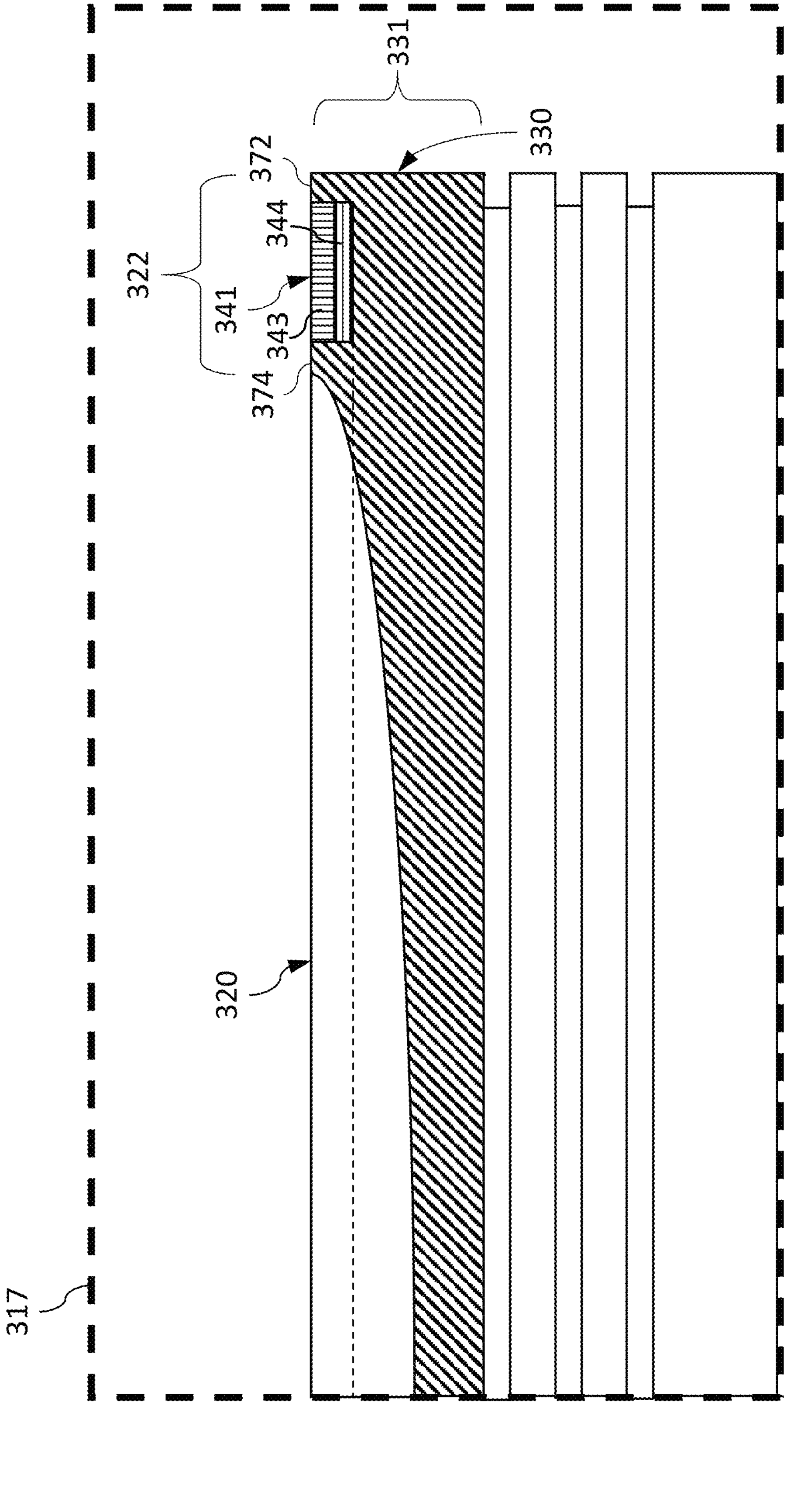
FIG. 19 is a partially sectional side view of the piston of FIG. 18.
Figure 20:
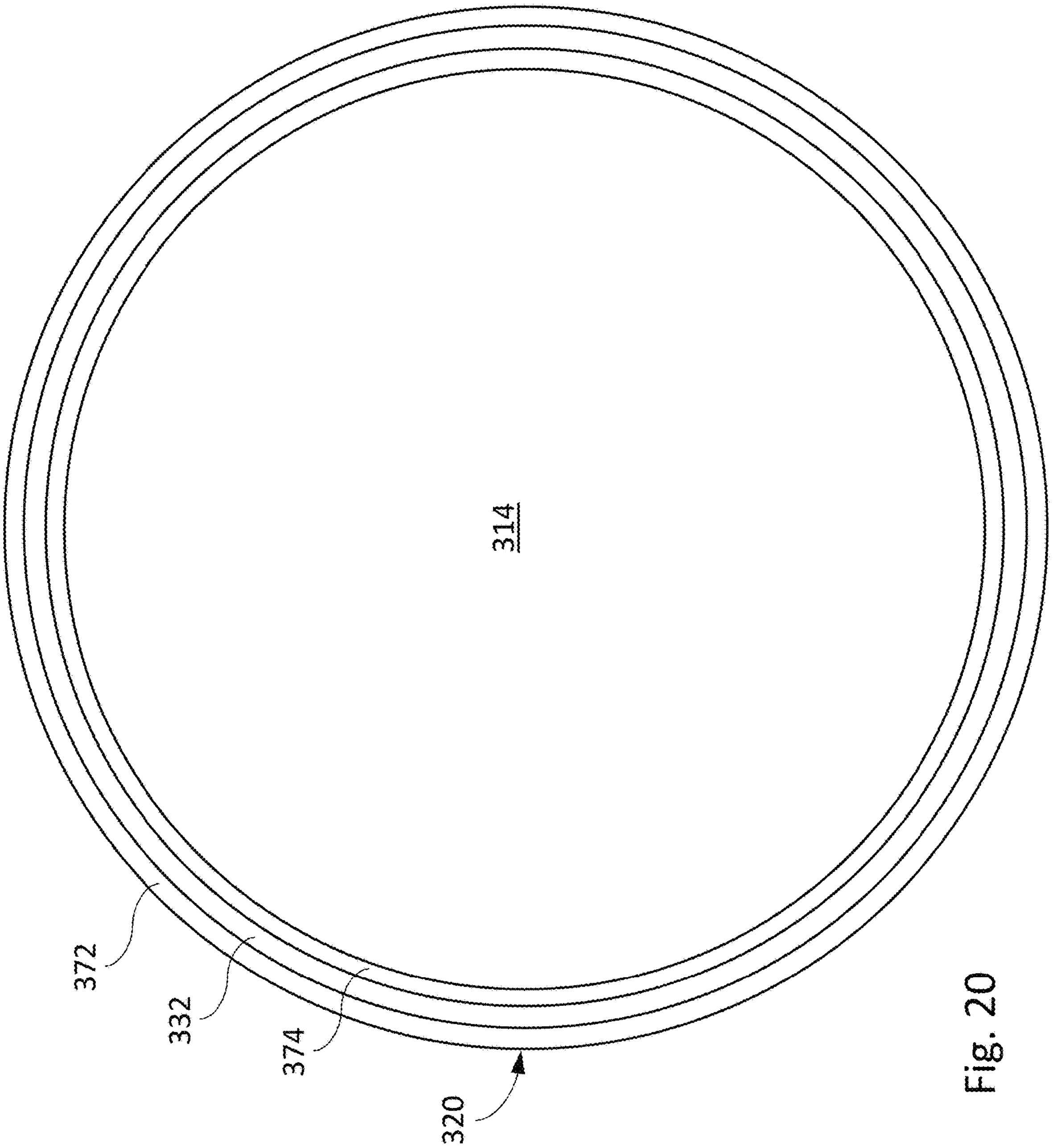
FIG. 20 is an end view of the piston of FIG. 18.

As illustrated in FIG. 18 and FIG. 19 (which illustrates an enlarged portion 317 of FIG. 18) as well as in FIGS. 20-21, a thermal barrier coating (TBC) 341 is inlaid in pocket 332 and includes a ceramic-metallic layer 344, and a ceramic layer 343. The ceramic-metallic layer 344 is applied directly to the base metal pocket surface 327 and directly coats the base metal pocket surface 327. The ceramic layer 343 is applied directly to the ceramic-metallic layer and directly coats the ceramic-metallic layer. The ceramic layer 343 includes an outer surface oriented to face a combustion cylinder (e.g., one of combustion cylinders 2 of engine 1). The ceramic-metallic layer 344 and the ceramic layer 343 may comprise the same materials described above in connection with the ceramic-metallic layer and the ceramic layer of cylinder head 10 may have the same average depths or thicknesses as the ceramic-metallic layer and the ceramic layer of cylinder head 10.

In the illustrated embodiment, the TBC 341 is substantially coextensive with the pocket 332 is positioned and extends intermediate the radially inner annular base metal portion 374 of the crown 312 and the radially outer annular base metal portion 372 of the crown 312. In embodiments where the pocket 332 is positioned and extends from the radially inner annular base metal portion 374 of the crown 312 to the outer diameter of the piston 300 and the radially outer annular base metal portion 372 of the crown 312 is omitted, the TBC 341 may also be substantially coextensive with the pocket 332 and may be is positioned and extend from the radially inner annular base metal portion 374 of the crown 312 to the outer diameter of the piston 300.

TBC 341 may be inlaid into pocket 332 using techniques and operations corresponding to those described above in connection with FIGS. 4-14 with piston 300 serving as a base metal workpiece in lieu of cylinder head 10. An example method of manufacturing piston 300 may include providing or obtaining a piston and forming an inlay pocket such as pocket 332, for example, by machining a recess into the piston 300 to a desired depth. In some embodiments, the machining operation may be omitted and a piston including pre-formed inlay pockets may be utilized. The method further includes applying a ceramic-metallic coat is applied directly to an uncoated base metal pocket surface 327 of the pocket 332, and applying a ceramic coat directly to the ceramic-metallic coat.

In the illustrated embodiment, the radially outer annular base metal portion 372 extends radially over a distance D1 of the crown surface region 322. The pocket 332 and the TBC 341 disposed therein extend radially over a distance D2 of the crown surface region 322. The radially inner annular base metal portion 374 extends radially over a distance D3 of the crown surface region 322. As noted above, in some embodiments, the radially outer annular base metal portion 372 may be omitted and the pocket 332 and the TBC 341 disposed therein extend radially over distance D2 and distance D3. In such embodiments, the outer diameter of the TBC 341 may be ground or otherwise surface treated to decrease its surface roughness using surface treating operations and techniques such as those described elsewhere herein.

The side surface region 330 comprises an upper land surface region 331 extending downward from the crown surface region 322, a ring groove surface region 333 extending downward from the upper land surface region 331, a skirt surface region 335 extending downward from the ring groove surface region 333, a second ring groove surface region 337 extending downward from the skirt surface region 335, and a lower land surface region 339 extending downward from the second ring groove surface region 337.

In the illustrated example, the piston 300 is adapted and configured for use in a four-stroke, reciprocating piston diesel engine. In other embodiments, the piston 300 may be differently adapted and configured for use in other types of engines. In some other embodiments, piston 300 may not include the middle land 315, the lower ring grooves 317*a*, 317*b*, 317*c*, and the lower land 319. In some such other embodiments, piston 300 may include a piston skirt instead of the middle land 315, the lower ring grooves 317*a*, 317*b*, 317*c*, and the lower land 319. A number of other variations and modifications in piston arrangement, features, forms, geometries, structures, and surfaces are contemplated, as will occur to one of skill in the art with the benefit of the present disclosure.

As illustrated by the present description, cylinder head 10 and piston 300 are examples of combustion cylinder end face components that provide end face surfaces bounding or delimiting ends of a combustion cylinder. In some embodiments, two opposing pistons may comprise respective end face components which provide end face surfaces bounding or delimiting ends of a combustion cylinder, rather than having a cylinder head 10.

Engines including one or both of a cylinder head such as cylinder head 10 or another cylinder heads according to the present disclosure and a piston such as piston 300 or another piston according to the present disclosure provide a number of unique technical effects.

In one aspect, the recessing of TBC 43 into the pocket 20 of the cylinder head 10 provides improved resistance to delamination of the thermal barrier coating 43.

In another aspect, the recessing of TBC 341 into the pocket 332 of the piston 300 provides improved resistance to delamination of the TBC 341.

In a further aspect, providing the TBC 341 on only a portion of the crown of the piston while leaving the remainder of the piston without a thermal barrier coating including the bowl mitigates undesirable effects on combustion due to interaction of combustion gasses with the surface of a thermal barrier coating and avoids over-temperature conditions which can result in piston ring welding and similar failures by providing a sufficient heat transfer path via uncoated surfaces of the piston.

In another aspect, the pocket 332 and the TBC 341 inlaid therein may be provided with dimensions such that the ceramic-metallic layer 344 of the TBC 341 has an average thickens of 125 μm+/−20% and the ceramic layer 343 of the TBC 341 has an average thickens of 350 μm+/−20%. For some example embodiments, such as those including the example thermal barrier coating compositions disclosed herein, these dimensions provide a three-factor optimization of volumetric specific heat of the TBC 341, the thermal conductivity of the TBC 341, and delamination resistance of the TBC 341. Such a three-factor optimization provides a combination of properties that allow the TBC 341 to cool to a temperature lower than the temperature of the base metal of the piston 300 during an intake stroke of the engine (which reduces heating of the intake charge by the piston effective to increase charge flow and volumetric efficiency of the engine) and to heat to a temperature that is greater than the temperature of the base metal of the piston 300 during a combustion stroke of the engine (which decreases the temperature difference between the thermal barrier coating and combustion gasses effective to reduces heat loss into the piston) while also minimizing depth sectional exposure of the TBC 341 to high temperature, high-velocity combustion gasses (which improves durability and resistance to delamination of the TBC 341).

As illustrated by the foregoing description, the present disclosure contemplates multiple embodiments including the following examples.

A first example embodiments is an apparatus for a combustion cylinder of a reciprocating piston engine, the apparatus comprising: a combustion cylinder end face component including a first side configured to face the combustion cylinder and extending in a radial direction of the combustion cylinder and a pocket recessed into the first side and including a recessed pocket surface, the combustion cylinder end face component being one of a piston and a cylinder head; and a thermal barrier coating inlaid in the pocket, the thermal barrier coating comprising a ceramic-metallic layer directly coating the recessed pocket surface and a ceramic layer directly coating the ceramic-metallic layer and including an outer surface facing the combustion cylinder.

A second example embodiment includes the features of the first example embodiment, wherein the combustion cylinder end face component is the cylinder head.

A third example embodiment includes features of the second example embodiment, wherein the outer surface of the ceramic layer has a roughness equal to or less than a roughness of a surface of the first side of the cylinder head.

A fourth of the example embodiments includes the features of the first example embodiment, wherein the thermal barrier coating consists essentially of the ceramic-metallic layer and the ceramic layer.

A fifth example embodiment includes features of the second example embodiment, wherein a diameter of the pocket in the radial direction is equal to a diameter of the combustion cylinder.

A sixth example embodiments includes the features of any one of the second through fifth example embodiments, wherein the ceramic-metallic layer has an average thickens of 125 μm+/−20%.

A seventh example embodiments includes the features of any one of the second through fifth example embodiments, wherein the ceramic layer has an average thickens of 350 μm+/−20%.

A eighth example embodiments includes the features of any one of the second through fifth example embodiments, and comprises a valve including an outer valve face configured to face the combustion cylinder and being covered with the thermal barrier coating.

A ninth example embodiments includes the features of any one of the second through fifth example embodiments, wherein the thermal barrier coating is the only thermal barrier coating of the cylinder head.

A tenth example embodiments includes the features of any one of the second through fifth example embodiments, wherein the outer surface of the thermal barrier coating is co-planar with a plane bounding the first side of the cylinder head.

An eleventh example embodiments includes the features of the first example embodiment, wherein the combustion cylinder end face component is the piston.

A twelfth example embodiments includes the features of the eleventh example embodiment, wherein the first side of the piston includes a centrally positioned piston bowl and a crown positioned radially outward from the centrally positioned piston bowl, and the pocket is recessed into the crown.

A thirteenth example embodiments includes the features of the twelfth example embodiment, wherein of the pocket is defined intermediate a radially outer annular portion of the crown and a radially inner annular portion of the crown.

A fourteenth example embodiments is a reciprocating piston engine comprising: a cylinder head located at a first end of a combustion cylinder, the cylinder head including: a first side oriented toward the combustion cylinder, a first pocket recessed into the first side, and a first thermal barrier coating inlaid in the first pocket and including a first outer surface facing the combustion cylinder; and a piston located at a second end of the combustion cylinder, the piston including: a second side oriented toward the combustion cylinder and including a centrally positioned piston bowl and a crown positioned radially outward from the centrally positioned piston bowl, a second pocket recessed into the crown of the second side, and a second thermal barrier coating inlaid in the second pocket and including a second outer surface facing the combustion cylinder.

A fifteenth example embodiments includes the features of the fourteenth example embodiment, wherein the first thermal barrier coating comprises a first ceramic-metallic layer directly coating a recessed surface of the first pocket and a first ceramic layer directly coating the first ceramic-metallic layer and including the first outer surface.

A sixteenth example embodiments includes the features of the fourteenth example embodiment, wherein the second thermal barrier coating comprises a second ceramic-metallic layer directly coating a recessed surface of the second pocket and a second ceramic layer directly coating the second ceramic-metallic layer and including the second outer surface.

A seventeenth example embodiments includes the features of the fourteenth example embodiment, wherein the second pocket is positioned intermediate a radially outer annular base metal portion of the crown and a radially inner annular base metal portion of the crown.

An eighteenth example embodiments includes the features of any one of the fourteenth through seventeenth example embodiments, and comprises: a valve located at a port defined in the cylinder head, the valve including a third side facing the combustion cylinder and a third thermal barrier coating directly coating the third side and including a third outer surface oriented to face the combustion cylinder.

A nineteenth example embodiment includes the features of the eighteenth example embodiment, wherein the third thermal barrier coating comprises a third ceramic-metallic layer directly coating the third side and a third ceramic layer directly coating the third ceramic-metallic layer and including a third outer surface facing the combustion cylinder.

A twentieth example embodiment includes the features of the eighteenth example embodiment, wherein the first thermal barrier, the second thermal barrier, and the third thermal barrier are the only thermal barrier portions of the cylinder head, the piston and the valve.

A twenty-first example embodiment is a method comprising: applying a ceramic-metallic coating layer directly to a plurality of uncoated base metal surface areas of a cylinder head assembly, the cylinder head assembly including a cylinder head with a recessed pocket extending into a first side of the cylinder head and a valve seated in a port located in a region of the recessed pocket, a pocket surface of the recessed pocket being a first one of the plurality of uncoated base metal surface areas and a valve surface of the valve being a second one of the plurality of uncoated base metal surface areas; applying a ceramic coating layer directly to a plurality of ceramic-metallic coated surface areas positioned over corresponding ones of the plurality of uncoated base metal surface areas including the first one of the plurality of uncoated base metal surface areas and the second one of the plurality of uncoated base metal surface areas; separating the valve and the cylinder head; surface treating a first area of the ceramic coating layer positioned over the first one of the plurality of uncoated base metal surface areas to decrease surface roughness of the first area; and surface treating a second area the ceramic coating layer positioned over the second one of the plurality of uncoated base metal surface areas to decrease surface roughness of the second area.

A twenty-second example embodiment includes the features of the twenty-first example embodiment, wherein the surface treating the first area of the ceramic coating layer comprises surface treating the first area from a first thickness proud of the first side to a second thickness less than the first thickness.

A twenty-third example embodiment includes the features of the twenty-second example embodiment, wherein the surface treating the second area of the ceramic coating layer comprises surface treating the second area to a third thickness, the third thickness being equal to or less than the second thickness.

A twenty-fourth example embodiment includes the features of the twenty-first example embodiment, wherein the surface treating the first area of the ceramic coating layer comprises surface treating the first area to a decreased roughness equal to or less than a base metal roughness of the first side of the cylinder head.

A twenty-fifth example embodiment includes the features of the twenty-first example embodiment, and comprises placing the valve in a surface treating jig after the separating and prior to the surface treating the second area, wherein the surface treating the second area comprises surface treating the second area from a third thickness proud of the surface treating jig to a fourth thickness less than the third thickness.

A twenty-sixth example embodiment includes the features of the twenty-fifth example embodiment, wherein the surface treating the second area from the third thickness to the fourth thickness comprises surface treating the second area to the fourth thickens equal to a thickness of the first area of the ceramic coating layer.

A twenty-seventh example embodiment includes the features of the twenty-fifth example embodiment, and comprises reseating the valve in the cylinder head.

A twenty-eighth example embodiment includes the features of the twenty-seventh example embodiment, and comprises coupling the cylinder head with an engine block.

A twenty-ninth example embodiment includes the features of the twenty-first example embodiment, and comprises machining the recessed pocket into the cylinder head.

A thirtieth embodiments includes the features of any one of the twenty-first through twenty-ninth example embodiments, wherein the surface treating the first area of the ceramic coating layer comprises grinding the first area of the ceramic coating layer.

A thirty-first embodiments includes the features of any one of the twenty-first through twenty-ninth example embodiments, wherein the surface treating the second area of the ceramic coating layer comprises grinding the second area of the ceramic coating layer.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An apparatus for a combustion cylinder of a reciprocating piston engine, the apparatus comprising:

a combustion cylinder end face component including a first side configured to face the combustion cylinder and extending in a radial direction of the combustion cylinder and a pocket recessed into the first side and including a recessed pocket surface, the combustion cylinder end face component being one of a piston and a cylinder head; and a thermal barrier coating inlaid in the pocket, the thermal barrier coating comprising a ceramic-metallic layer directly coating the recessed pocket surface and a ceramic layer directly coating the ceramic-metallic layer and including an outer surface facing the combustion cylinder, the thermal barrier coating filling the pocket to define a planar surface including at least a portion of the first side and the thermal barrier coating.

2. The apparatus of claim 1, wherein the combustion cylinder end face component is the cylinder head.

3. The apparatus of claim 2, wherein the outer surface of the ceramic layer has a roughness equal to or less than a roughness of a surface of the first side of the cylinder head.

4. The apparatus of claim 2, wherein a diameter of the pocket in the radial direction is equal to a diameter of the combustion cylinder.

5. The apparatus of claim 2, wherein the ceramic-metallic layer has an average thickens of 125 μm+/−20%.

6. The apparatus of claim 2, wherein the ceramic layer has an average thickens of 350 μm+/−20%.

7. The apparatus of claim 2, comprising a valve including an outer valve face configured to face the combustion cylinder and being covered with the thermal barrier coating.

8. The apparatus of claim 2, wherein the thermal barrier coating is the only thermal barrier coating of the cylinder head.

9. The apparatus of claim 2, wherein the outer surface of the thermal barrier coating is co-planar with a plane bounding the first side of the cylinder head.

10. The apparatus of claim 1, wherein the thermal barrier coating consists essentially of the ceramic-metallic layer and the ceramic layer.

11. The apparatus of claim 1, wherein the combustion cylinder end face component is the piston.

12. The apparatus of claim 11, wherein the first side of the piston includes a centrally positioned piston bowl and a crown positioned radially outward from the centrally positioned piston bowl, and the pocket is recessed into the crown.

13. The apparatus of claim 12, wherein the pocket is defined intermediate a radially outer annular portion of the crown and a radially inner annular portion of the crown.

14. A reciprocating piston engine comprising:

a cylinder head located at a first end of a combustion cylinder, the cylinder head including:

a first side oriented toward the combustion cylinder, a first pocket recessed into the first side, and a first thermal barrier coating inlaid in the first pocket and including a first outer surface facing the combustion cylinder; and a piston located at a second end of the combustion cylinder, the piston including:

a second side oriented toward the combustion cylinder and including a centrally positioned piston bowl and a crown positioned radially outward from the centrally positioned piston bowl, a second pocket recessed into the crown of the second side, and a second thermal barrier coating inlaid in the second pocket and including a second outer surface facing the combustion cylinder, wherein at least one of: (a) the first thermal barrier coating fills the first pocket to provide a first planar surface including at least a portion of the first side and the first thermal barrier coating, and (b) the second thermal barrier coating fills the second pocket to provide a second planar surface including at least a portion of the second side and the second thermal barrier coating.

15. The reciprocating piston engine of claim 14, wherein the first thermal barrier coating comprises a first ceramic-metallic layer directly coating a recessed surface of the first pocket and a first ceramic layer directly coating the first ceramic-metallic layer and including the first outer surface.

16. The reciprocating piston engine of claim 14, wherein the second thermal barrier coating comprises a second ceramic-metallic layer directly coating a recessed surface of the second pocket and a second ceramic layer directly coating the second ceramic-metallic layer and including the second outer surface.

17. The reciprocating piston engine of claim 14, wherein the second pocket is positioned intermediate a radially outer annular base metal portion of the crown and a radially inner annular base metal portion of the crown.

18. The reciprocating piston engine of claim 14, comprising: a valve located at a port defined in the cylinder head, the valve including a third side facing the combustion cylinder and a third thermal barrier coating directly coating the third side and including a third outer surface oriented to face the combustion cylinder.

19. The reciprocating piston engine of claim 18, wherein the third thermal barrier coating comprises a third ceramic-metallic layer directly coating the third side and a third ceramic layer directly coating the third ceramic-metallic layer and including a third outer surface facing the combustion cylinder.

20. The reciprocating piston engine of claim 18, wherein the first thermal barrier, the second thermal barrier, and the third thermal barrier are the only thermal barrier portions of the cylinder head, the piston and the valve.

* * * * *